Patented Aug. 13, 1935

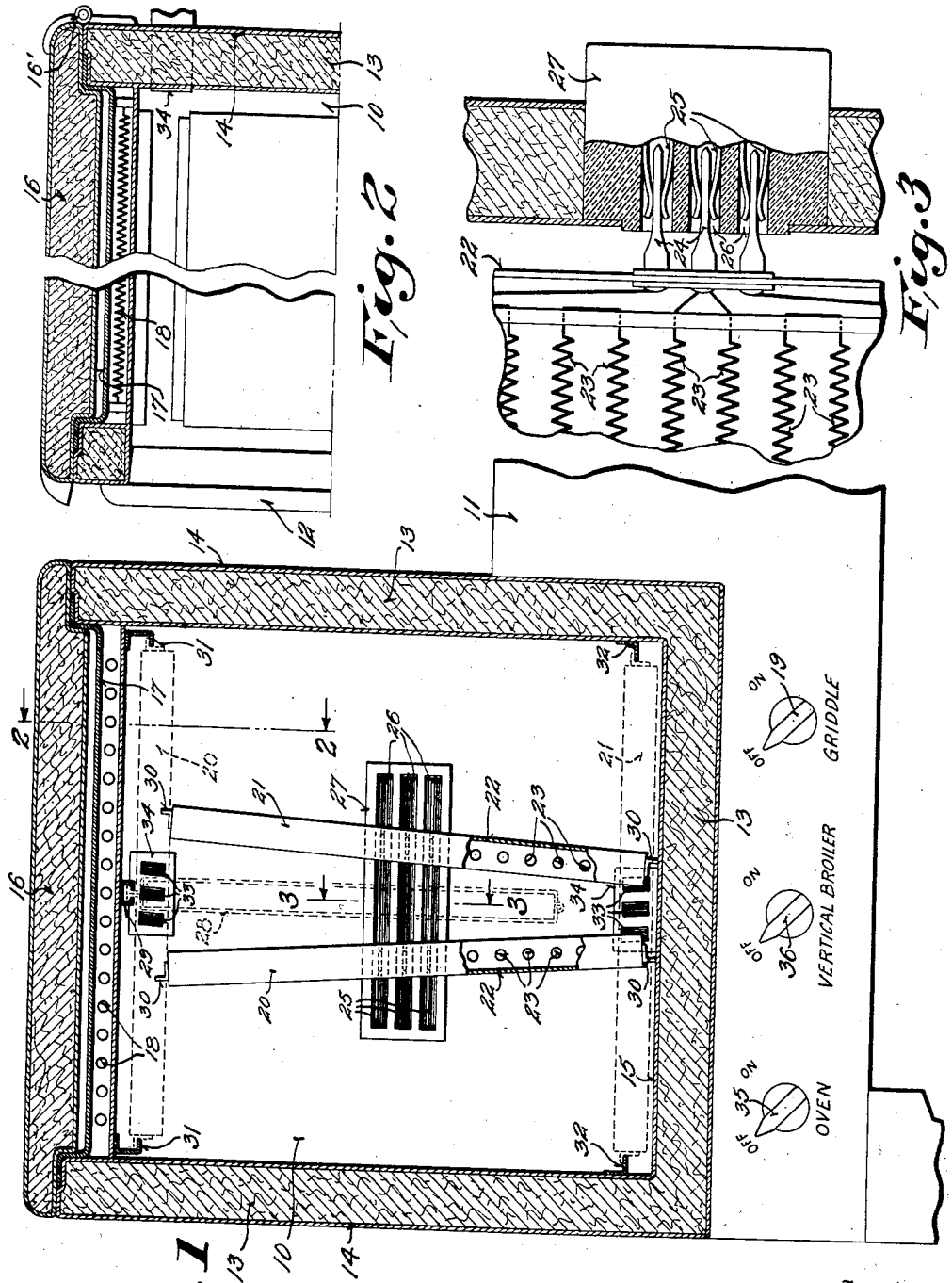

2,011,035

UNITED STATES PATENT OFFICE 2,011,035

COOKER

Edgar Collat, Shorewood, and Walter A. Kant, Lake, Wis., assignors to Kanco, Inc., Milwaukee, Wis., a corporation of Wisconsin Application December 1, 1932, Serial No. 645,146

7 Claims. (Cl. 219—35)

This invention relates to cookers.

One object of the present invention is the provision of a multi-purpose cooker involving a novel combination of parts so arranged as to utilize to advantage the heat ordinarily wasted in separate single-purpose cookers.

This we have accomplished, in the cooker hereinafter described, by combining in a single unit a baking and broiling compartment and a griddle, so arranged that the heat developed during a baking or broiling process is utilized to pre-heat the griddle and the heat developed during use of the griddle is utilized to pre-heat the baking and broiling compartment.

This arrangement not only conserves a large portion of the heat heretofore lost in prior cookers, but by reason of this heat exchange, and the consequent preheating of the cooker parts, each part is available for instant use, thereby substantially eliminating the time and energy losses heretofore experienced in bringing a cooker part up to a cooking temperature. Because of these novel characteristics, the cooker of the present invention may be used to particular advantage in restaurants and the like, where repeated and quick changes from one type of cooking to another is required to meet the varying service demands, although the device may also be employed to advantage as a domestic cooker.

Another object is the provision of a cooking compartment which, by ready adjustment of the heating units, may be promptly converted into either an efficient baker or an efficient broiler.

Another object is the provision of an improved vertical type broiler which may be readily adjusted and adapted to broil or toast various kinds of foodstuffs.

Other more specific objects and advantages will appear from the following description of an illustrative embodiment of the present invention.

For purposes of illustration and explanation the present invention is shown and described as embodied in an electric cooker, although certain novel features thereof may be applied to equal advantage in gas or like cookers.

In the accompanying drawing:

Figure 1 is a sectional view of a cooker constructed in accordance with the present invention, and showing the same as embodied in the oven of an electric range.

Fig. 2 is a fragmentary sectional view taken substantially along the line 2—2 of Fig. 1.

Fig. 3 is a fragmentary sectional view, on a somewhat larger scale, taken substantially along the line 3—3 of Fig. 1.

The cooker shown comprises a compartment 10, constituting the oven of a conventional electric range 11. The oven is equipped with the usual front door 12 and is preferably completely insulated by a heat proof filler 13 in the walls 14 and bottom 15 thereof. In this instance the compartment 10 is also equipped with a similarly insulated movable cover 16, preferably hinged, as at 16'.

Supported by and spanning the top of the compartment 10, beneath the cover 16, is a metal griddle 17, preferably of dished form, which affords an extended surface appropriate for frying. The griddle is of course rendered available for use by lifting or removing the cover 16. The griddle is heated in this instance by a grid-like electrical unit 18 of a well known type, permanently supported below and substantially coextensive with the frying surface of the griddle. The unit 18 may be energized and controlled in any known or approved manner by appropriate means under the control of a switch button 19.

The compartment 10 is further equipped with additional heating units 20 and 21, preferably of a type similar to the electrical unit 18. Each includes a rectangular frame 22 carrying a series of electrical resistance elements 23 suspended thereacross and energized in a well known manner through a plurality of substantially flat prongs 24 fixed to the frame.

The units 20 and 21 are movably mounted and may be alternatively arranged for baking or roasting or for broiling or toasting. For broiling or toasting they are arranged as indicated in full lines in Fig. 1. In this position, each unit rests upon the floor of the compartment 10 and each extends upwardly in spaced relation to and slightly inclined with respect to the other unit. Each is sustained in this position by its prongs 24 which are frictionally engaged within appropriate bus bars 25. The bus bars shown are of a hollow clip-like type designed to resiliently grip the inserted prong 24, and they are horizontally supported in horizontal slots 26 formed in a block 27 of insulating material fixed in the real wall of the compartment 10. (See Fig. 3.)

It will be noted from an inspection of Fig. 1 that each prong 24 is slightly inclined with respect to the plane of the frame 22, so as to properly engage a horizontal bus bar 25 when the frame 22 of a unit is in the upright and slightly inclined position shown.

This arrangement of horizontal bus bars 25 and prongs 24 permits a ready horizontal adjustment of the units 20 and 21 to regulate the spacing between them, and to thereby render them readily adaptable to various kinds and forms of food stuffs placed therebetween. The food to be broiled or toasted is ordinarily supported in a rack 28 of conventional design removably suspended from an appropriate rail 29 provided in the top of the compartment.

The units 20 and 21 are withdrawable from the positions just described and may be disposed in the dotted line positions shown, in the top and bottom, respectively, of the compartment 10, when it is desired to use the compartment as an oven for baking or roasting. For this purpose the frames 22 of the units are equipped with appropriate end brackets 30 designed to rest on appropriate supporting rails 31 and 32 fixed in the top and bottom of the compartments.

When the units are thus disposed for baking or roasting, the prongs 24 of each engage current carrying contact clips 33 contained in appropriate receptacles 34 provided in the rear wall of the compartment. It will be noted that the clips 33 are slightly inclined from a true vertical so as to match the inclination of the prongs 24 and thereby assure proper engagement therewith.

The contact clips 33 and the bus bars 25 are supplied with electrical energy in a well known manner, the former through appropriate means under the control of switch button 35, and the latter through appropriate means under the control of a switch button 36.

During roasting, baking, broiling or toasting, the cover 16 of the compartment is ordinarily in the closed position shown so that there is no appreciable loss of heat from the compartment. During such use the griddle 17 absorbs heat from the compartment and is maintained at a temperature corresponding thereto. The griddle, thus preheated, is thus ready for instant use, and is rendered available merely by lifting the cover 16 and by turning the switch button 19.

While the griddle 17 is in use the heat developed by the heating unit 18 serves to pre-heat the compartment 10 and to thus maintain the same in condition for substantially instantaneous use when required.

It will also be noted that by rearranging the heating units 20 and 21 the compartment may be readily adapted alternatively, either for baking or roasting, or for broiling or toasting.

Various changes may be made in the embodiment of the invention hereinabove specifically described without departing from or sacrificing the advantages of the invention as defined in the appended claims.

We claim:—

1. A cooker comprising a cooking compartment and a griddle zone at the upper end of the compartment surrounded by heat insulated walls, a horizontal partition wall separating the compartment and zone and forming thermal communication therebetween, a griddle in the griddle zone providing a frying surface, a heat insulated cover over said griddle and spaced from said surface, said cover being movable to expose said surface for frying, and separate independently controlled means in the cooking compartment and griddle zone for heating said compartment to a cooking temperature and said griddle to a frying temperature respectively and when operated independently for substantially preparing the other for operation.

2. A cooker comprising a cooking compartment having heat insulating walls, a griddle zone above the compartment, a horizontal partition separating the cooking compartment from the griddle zone and forming thermal communication therebetween, a griddle in the griddle zone providing a frying surface, a heat insulated cover over said griddle and spaced from said surface, said cover being movable to expose said surface for frying, means above the partition for heating the griddle to frying temperature with heat therefrom emanated to the cooking compartment to raise the temperature to substantially cooking temperature and separate heating means in said compartment to raise the same to cooking temperature with heat therefrom emanated to the griddle zone to raise the temperature to substantially frying temperature.

3. A cooker comprising a heat insulated compartment, a griddle zone above the compartment, a partition separating the compartment and griddle zone and forming thermal communication therebetween, a griddle in the griddle zone having a frying surface, an electric heating unit above the partition and beneath the griddle for heating the griddle to frying temperature with heat emanated to the compartment to prepare the same for cooking temperature, a heat insulated cover for the griddle spaced from said surface and cooperating with the compartment to conserve the griddle heat, and an electric heater in the compartment for heating the same to cooking temperature with heat emanated to the griddle zone to prepare the griddle for frying temperature.

4. A combination cooker having a cooking compartment, a movable top cover therefore, a horizontal partition in the compartment spaced from the cover, means below the partition for heating said compartment to a cooking temperature, a griddle beneath said cover and above the partition and exposable by movement of the cover, and additional means above the partition for heating said griddle to a frying temperature, said griddle and compartment being in thermal communication by means of the partition so that each is automatically maintained at respective frying and cooking temperatures appropriate for immediate use during use of the other.

5. A cooker comprising a chamber, means in the chamber defining a lower cooking zone and an upper griddle zone, separate heating means in the cooking zone and griddle zone, a griddle in the griddle zone overlying the heating means therein, a movable cover overlying the griddle, said first named means shielding each zone from direct radiation of heat from the heaters in the respective zones and forming thermal communication between the two zones whereby each zone is maintained at a temperature for substantially immediate use by heat generated during use of the other.

6. A cooker comprising a chamber, means in the chamber defining a lower cooking zone and an upper griddle zone, separate heating means in the cooking zone and griddle zone, a griddle removably mounted in the griddle zone overlying the heating means therein, a movable cover overlying the griddle, said first named means shielding each zone from direct radiation of heat from the heaters in the respective zones and forming thermal communication between the two zones whereby each zone is maintained at a temperature for substantially immediate use by heat generated during use of the other.

7. A combination cooker having a cooking compartment, a movable top cover therefor, a plurality of spaced electric heaters in opposite portions of said compartment for heating said compartment to a cooking temperature, a griddle beneath said cover and exposable by movements of said cover, an additional separately controlled electric heater beneath said griddle for heating the latter to a frying temperature, said compartment and griddle being related so that each is maintained at a temperature substantially appropriate for immediate use by heat generated during use of the other.

EDGAR COLLAT.
WALTER A. KANT.